United States Patent
Hur et al.

(10) Patent No.: US 9,568,804 B2
(45) Date of Patent: Feb. 14, 2017

(54) METHOD AND APPARATUS FOR GENERATING HIGH-POWER TERAHERTZ WAVE

(71) Applicant: UNIST Academy-Industry Research Corporation, Ulsan (KR)

(72) Inventors: Min Sup Hur, Ulsan (KR); Myung Hoon Jo, Ulsan (KR); Young Kuk Kim, Busan (KR)

(73) Assignee: UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 0 days.

(21) Appl. No.: 14/843,518

(22) Filed: Sep. 2, 2015

(65) Prior Publication Data

US 2016/0100476 A1 Apr. 7, 2016

(30) Foreign Application Priority Data

Oct. 7, 2014 (KR) .................. 10-2014-0134835

(51) Int. Cl.
*H05G 2/00* (2006.01)
*G02F 2/02* (2006.01)

(52) U.S. Cl.
CPC ............ *G02F 2/02* (2013.01); *G02F 2203/13* (2013.01); *H05H 2240/10* (2013.01)

(58) Field of Classification Search
CPC ................................. H05G 2/00; H05G 2/003
USPC .......................................... 250/493.1, 504 R
See application file for complete search history.

(56) References Cited

U.S. PATENT DOCUMENTS

| 2005/0147147 A1* | 7/2005 | Umstadter ............... H01S 3/30 372/73 |
| 2008/0258085 A1* | 10/2008 | Bauer .................... H05G 2/001 250/504 R |

FOREIGN PATENT DOCUMENTS

| JP | 2011-198568 A | 10/2011 |
| KR | 10-2010-0008052 A | 1/2010 |
| KR | 10-2012-0096781 A | 8/2012 |

OTHER PUBLICATIONS

Office action issued on Oct. 28, 2015 from Korean Intellectual Property Office in a counterpart Korean Patent Application No. 10-2014-0134835.

* cited by examiner

*Primary Examiner* — Nicole Ippolito
(74) *Attorney, Agent, or Firm* — The PL Law Group, PLLC

(57) ABSTRACT

A method and apparatus for generating terahertz waves using laser plasma are disclosed herein. The method of generating high-power terahertz waves includes generating plasma by focusing a laser beam on a gas within a vacuum chamber, radiating laser beams into the magnetized plasma from opposite directions so that the laser beams collide with each other at a preset location, and generating terahertz waves of a predetermined frequency through the oscillation of the plasma generated by the collision of the laser beams.

7 Claims, 5 Drawing Sheets

METHOD AND APPARATUS FOR GENERATING HIGH-POWER TERAHERTZ WAVE

BACKGROUND

1. Technical Field

The present invention relates generally to a method and apparatus for generating terahertz waves using laser plasma.

2. Description of the Related Art

Terahertz waves are signals in the band between the band of microwaves and the band of far-infrared light waves in the electromagnetic spectra, thereby exhibiting characteristics of both microwaves and light waves.

Terahertz waves have very important usages in spectroscopy or in the acquisition of high-density material transmission images thanks to the characteristics thereof. However, the development of terahertz wave applications has been slow because of the problem with the generation of electromagnetic waves in the corresponding frequency band and the difficulty in the implementation of measurement technology.

However, in recent years, terahertz waves have been generated and measured by the combination of a laser having a pulse width of hundreds of femto-seconds and an opto-photoconductive material having a carrier life time shorter than several pico-seconds, with the result that a variety of technologies using the characteristics of terahertz waves have been developed.

Because terahertz waves can pass through materials though which microwaves and light waves cannot pass, various apparatuses using such characteristics of terahertz waves are now being developed.

Meanwhile, in the conventional art, methods of generating high-power terahertz electromagnetic waves by radiating high-power laser beams into solid media are currently used to generate terahertz waves.

Although terahertz waves are evaluated as next-generation waves capable of replacing X rays because they can be used to analyze organisms without damage, the use of high-power terahertz waves has not yet been completely established. Terahertz (THz) waves generated by the interaction between plasma and one or more laser beams attract a lot of attention because they can achieve high power and various attainable frequencies. The principal methods of generating THz waves are illustrated in FIGS. 2A to 2C.

First, FIG. 2A illustrates a 2-color method in which THz waves are generated by simultaneously radiating two low-power laser beams having different wavelengths into plasma. The generated THz waves have a field strength of several MV/cm. Among the various methods, the 2-color method generates the highest power THz waves and relatively wide THz frequencies.

Next, FIG. 2B illustrates a linear mode transformation method in which THz waves are generated by radiating a high-power laser beam into a region where plasma varies in density. The generated THz waves have a field strength of several MV/cm and a relatively wide range of THz frequencies.

Finally, FIG. 2C illustrates a Cherenkov wake method in which THz waves are generated by radiating a high-power laser beam into magnetized plasma. Since there is a limitation to the intensity of a magnetic field, the generated THz waves have a low power and a relatively narrow range of THz frequencies.

As described above, only the Cherenkov wake method can achieve a narrow range of THz frequencies. However, the Cherenkov method requires a high-power laser.

SUMMARY

Some embodiments of the present invention are directed to the provision of a method and apparatus for generating terahertz waves, in which low-power laser beams collide with each other at the periphery of magnetized plasma and then terahertz (THz) waves are generated by a current that is formed in fine plasma waves formed by the collision and also oscillates at a plasma frequency.

In accordance with an aspect of the present invention, there is provided a method of generating high-power terahertz waves, including generating plasma by focusing a laser beam on a gas within a vacuum chamber; radiating laser beams into the magnetized plasma from opposite directions so that the laser beams collide with each other at a preset location; and generating terahertz waves of a predetermined frequency through the oscillation of the plasma generated by the collision of the laser beams.

In accordance with another aspect of the present invention, there is provided an apparatus for generating high-power terahertz waves, including a vacuum chamber; a gas regulator configured to supply a gas to the vacuum chamber; a laser generator configured to generate laser beams having a preset level of energy and a preset or lower level of power, and to radiate two laser beams toward a periphery of plasma within the vacuum chamber from opposite directions so that the two laser beams collide with each other; a plasma generator configured to generate plasma in response to a laser beam radiated into the vacuum chamber and focused on the gas; and a magnetic field generator configured to magnetize the plasma generated by the plasma generator, and to generate terahertz waves of a predetermined frequency using oscillation of the plasma generated through the collision of the opposite laser beams by the laser generator.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Embodiments of the present invention will be described in detail below with reference to the accompanying drawings. Although specific details, such as specific components, are described in the following description, it is apparent to those skilled in the art that they are provided merely to help the general understanding of the present invention and various modifications and variations may be made to them without departing from the spirit and scope of the present invention.

The present invention relates to the generation of terahertz waves using laser plasma. More specifically, the present invention is intended to provide a technology, in which low-power laser beams collide with each other at the periphery of magnetized plasma and then terahertz (THz) waves are generated by a current that is formed in the fine plasma waves formed by the collision and also oscillates at a plasma frequency, thereby generating MW/cm$^2$-level terahertz waves using a laser having a power ten times lower than that of a conventional high-power laser.

A method of generating high-power terahertz waves according to one embodiment of the present invention will be described below in detail with reference to FIG. 1.

Figure 1:
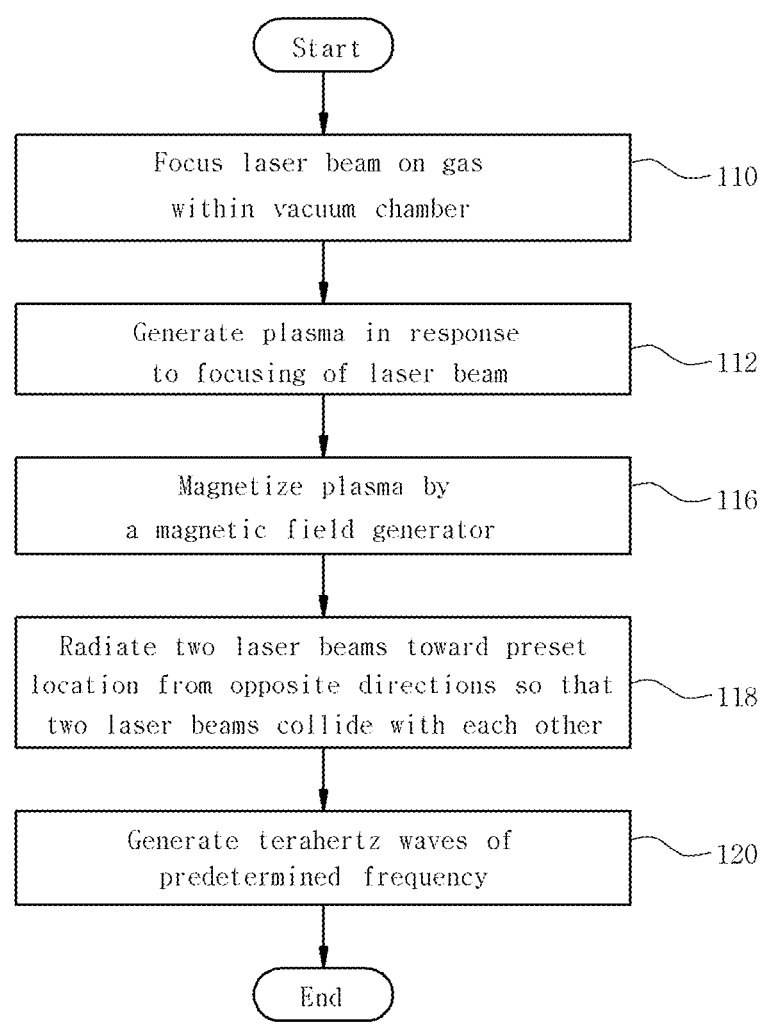
FIG. 1 is a flowchart illustrating a method of generating high-power terahertz waves according to an embodiment of the present invention.
Figure 2A:
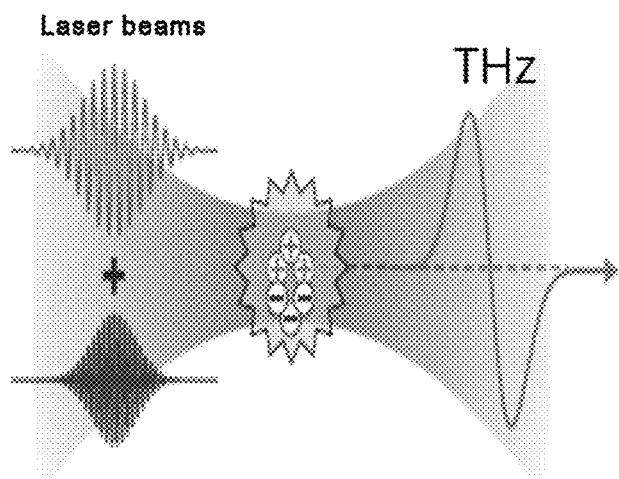
FIGS. 2A to 2C illustrate examples of a process related to a conventional method of generating terahertz waves.
Figure 2B:
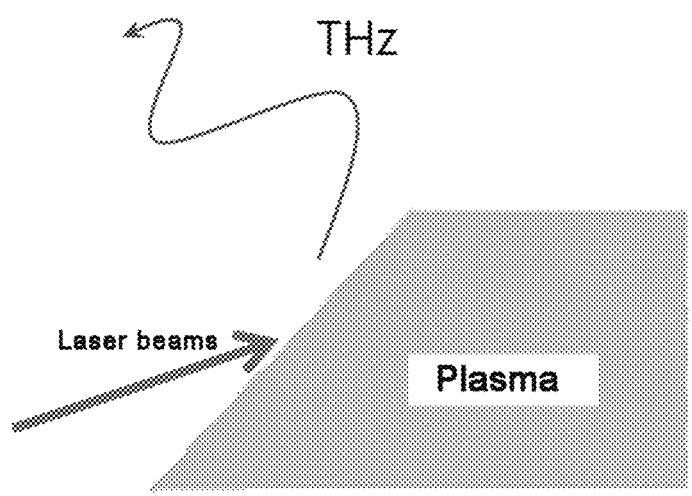
Figure 2C:
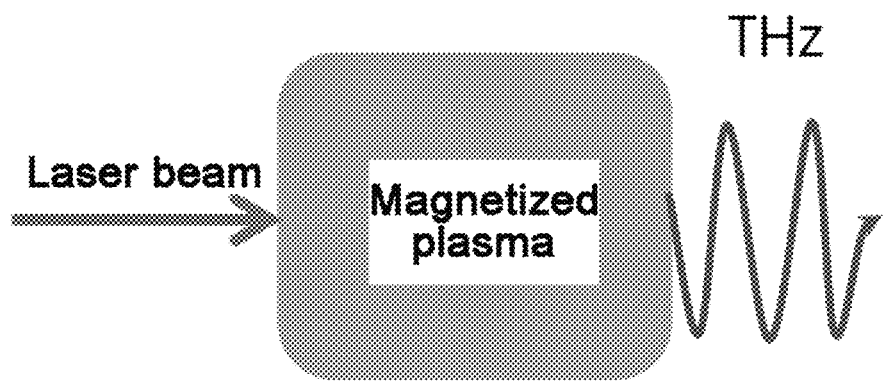

FIG. 1 is a flowchart illustrating the method of generating high-power terahertz waves according to the present embodiment.

Referring to FIG. 1, in operation 110, an apparatus for generating high-power terahertz waves according to an embodiment of the present invention focuses a laser beam on a gas within a vacuum chamber.

In this case, the vacuum chamber provides a space for receiving a gas injected thereinto and exciting the gas into plasma, thereby providing a space for generating plasma.

In operation 112, plasma is generated in response to the focusing of the laser beam.

The reactant gas is activated and transformed into the plasma by the focused laser beams. When a laser generator radiates a high-power laser beam onto a beam focusing unit, the beam focusing unit reflects and focuses the corresponding laser beam at a predetermined location within the vacuum chamber, and a gas present at the predetermined location within the vacuum chamber and having spatially different pressures is ionized by the focused laser beam, thereby generating plasma.

In operation 116, the generated plasma is magnetized by a magnetic field generator.

In operation 118, laser beams are oppositely radiated into the magnetized plasma to collide with each other at a preset location, and in operation 120, terahertz waves of a predetermined frequency are generated.

In this case, when laser beams with a predetermined or lower power collide with each other in the magnetized plasma, a critical or higher level of plasma waves are formed, and a current formed in the plasma waves generates terahertz waves while oscillating at a plasma frequency.

Figure 3:
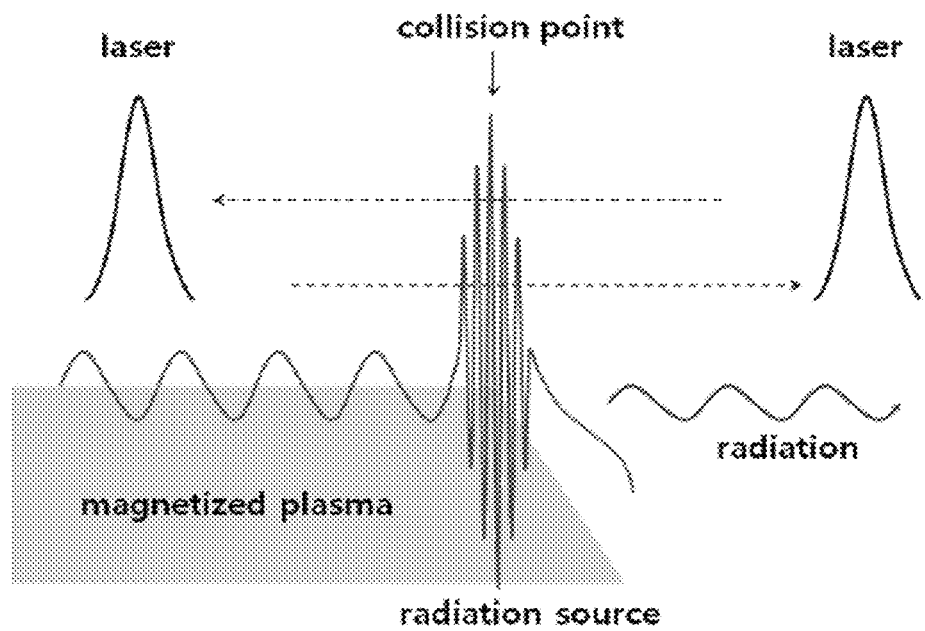
FIG. 3 illustrates an example of a process related to the method of generating high-power terahertz waves according to the embodiment of the present invention.

More specifically, the laser beams which are to be incident into the magnetized plasma are generated by the laser generator to have a preset level of energy and a preset or lower level of power. In the present invention, two laser beams are controlled such that they are directed toward a preset location, that is, the periphery of the plasma, from opposite directions, and thus collide with each other in the periphery of the plasma. This is the same as illustrated in FIG. 3. As illustrated in FIG. 3, fine plasma waves that are about ten times stronger than those in the case of a single laser beam are formed at the collision point of the laser beams, a current that is stationary but oscillates at a plasma frequency is formed by the plasma waves formed at the collision point of the laser beams, and terahertz waves are generated by the current. An equation related to this phenomenon is given as Equation 1 below:

$$\frac{eE_{THz}}{mc\omega} = \frac{\pi}{16} \frac{\omega_c}{\omega_p} \sigma^2 k^2 \alpha_0^4 e^{-0.084 \omega_p^2 \tau^2} \quad (1)$$

where $\sigma$ is the length of laser pulses/2, k is the number of laser waves, $\alpha_0$ is the normalized vector potential of the laser beams, $\tau$ is laser beam duration/2, $\omega_p$ is the plasma frequency, $\omega_c$ is eB/m, and $E_{THz}$ is the magnitude of the terahertz electric field.

In addition, the magnitude of the electric field inside the plasma is expressed by Equation 2 below:

$$\frac{e\hat{E}(x,t)}{mc\omega_p} \simeq -\frac{\sigma_J j_0}{\sqrt{2}} \frac{\bar{t}^{3/2}}{\bar{x}^2} \cos\left(\frac{\bar{x}^2}{2\bar{t}} + \frac{\pi}{4}\right) \quad \begin{array}{l} \sigma_J = \omega_p \sigma_J / c \\ j_0 = J_0 / en_0 c \\ \bar{t} = \omega_p t \end{array} \quad (2)$$

where $J_0$ is a current density deduced from Equation 1.

Figure 4A:
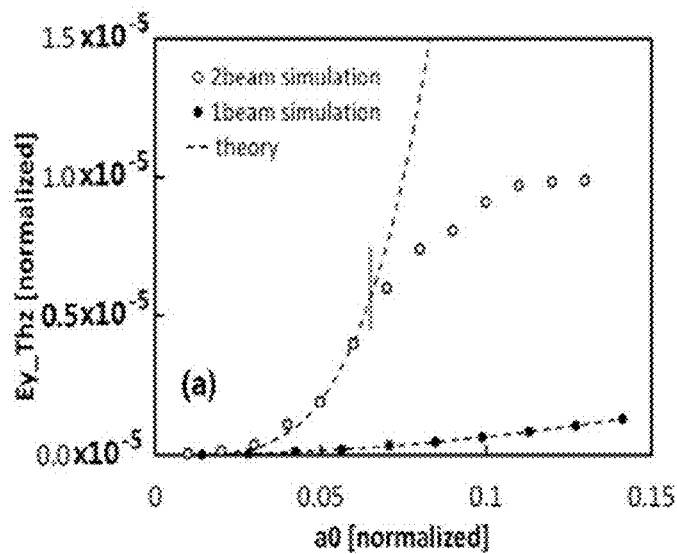
FIGS. 4A and 4B are graphs illustrating theoretical and simulation results related to the generation of terahertz waves to which the method of generating high-power terahertz waves according to the embodiment of the present invention has been applied.
Figure 4B:
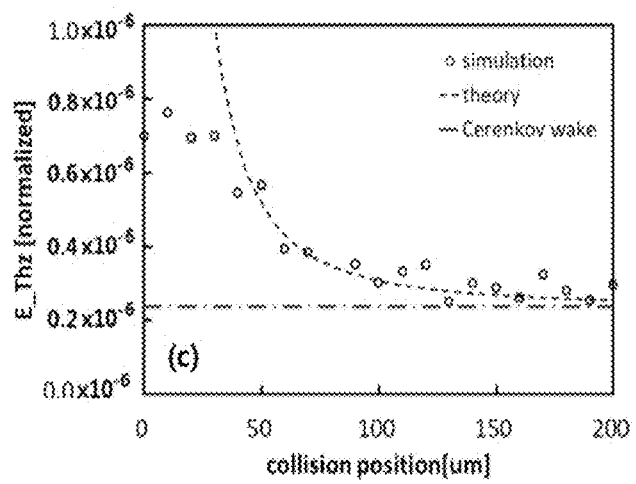

FIGS. 4A and 4B are graphs illustrating theoretical and simulation results related to the generation of terahertz waves to which the method of generating high-power terahertz waves according to the present embodiment has been applied.

As illustrated in FIG. 4A, the results of the comparison between THz waves based on laser power indicate that the intensity of THz waves in two-beam simulation is ten times higher than that in one-beam simulation. However, a low-power laser having a potential $\alpha_0$ less than 1 has to be used due to the wave breaking effect of plasma waves. Although the theoretical effective intensity is expressed by Equation 3 below, the same effect may be achieved at a somewhat higher laser power, as indicated in the results of the simulation:

$$\alpha_{sat} = \left(\frac{8}{\pi}\right)^{1/4} \sqrt{\frac{\omega_p}{\omega \sigma k}} \quad (3)$$

As illustrated in FIG. 4B, the results of the simulation to which the present invention has been applied indicate that THz waves have the highest intensity when a laser collision point is present at the boundary of plasma, and gradually decrease, as expressed by Equation 2 above, as the laser collision point moves from the boundary to the inside of the plasma.

The method of generating high-power terahertz waves according to the present embodiment has been described above.

An apparatus for generating high-power terahertz waves according to one embodiment of the present invention is described below with reference to FIG. 5.

Figure 5:
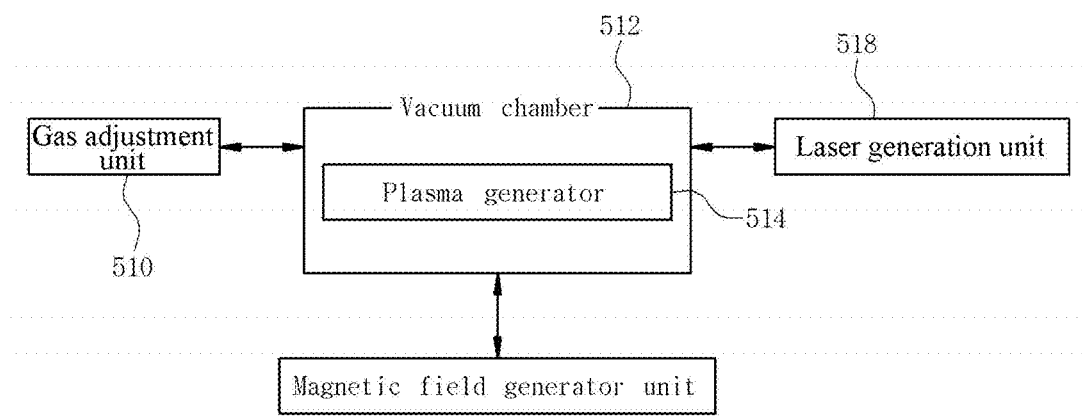
FIG. 5 is a block diagram of an apparatus for generating high-power terahertz waves according to an embodiment of the present invention.

FIG. 5 is a block diagram of the apparatus for generating high-power terahertz waves according to the present embodiment. The apparatus to which the present invention has been applied includes a gas regulator 510, a vacuum chamber 512, and a laser generator 518.

The vacuum chamber 512 includes a plasma generator 514, and provides a space for receiving a gas injected thereinto and then exciting the gas into plasma, thereby providing a space for generating plasma.

The gas regulator 510 is mounted onto the vacuum chamber 512, and supplies gas into the vacuum chamber 512.

The laser generator 518 generates laser beams having a preset level of energy and a preset or lower level of power and radiates two laser beams from opposite directions so that the two laser beams collide with each other at the periphery of plasma within the vacuum chamber 512.

The plasma generator 514 generates plasma in response to the laser beams radiated into the vacuum chamber 512 and focused on the gas.

The plasma generator 514 generates terahertz waves of a predetermined frequency using the oscillation of plasma generated through the collision of the opposite laser beams by the laser generator 518.

In other words, the laser beams which are to be input to the magnetized plasma are generated by the laser generator 518 to have a preset level of energy and a preset or lower level of power. In the present invention, two laser beams are controlled such that they are directed toward a preset location, that is, the periphery of the plasma, from opposite directions, and thus collide with each other in the periphery of the plasma. In this case, fine plasma waves that are about ten times stronger than those in the case of a single laser beam are formed at the collision point of the laser beams, a current that is stationary but oscillates at a plasma frequency is formed by the plasma waves formed at the collision point of the laser beams, and terahertz waves are generated by the current.

As described above, the present invention provides the method and apparatus for generating high-power terahertz waves, which are capable of generating MW/cm$^2$-level terahertz waves using a laser having a power ten times lower than that of a conventional high-power laser.

The method and apparatus for generating high-power terahertz waves according to the present invention may be operated as described above. Although the specific embodiments of the present invention have been described for illustrative purposes, various modifications and variations can be made without departing from the scope and spirit of the present invention. Accordingly, the scope of the present invention should not be determined by the above-described embodiments but by the following claims and equivalents thereto.

What is claimed is:

1. A method of generating high-power terahertz waves, comprising:
   generating plasma by focusing a laser beam on a gas within a vacuum chamber;
   magnetizing the generated plasma by a magnetic field generator;
   radiating laser beams into the magnetized plasma from opposite directions so that the laser beams collide with each other at a preset location; and
   generating terahertz waves of a predetermined frequency through oscillation of the plasma generated by the collision of the laser beams.

2. The method of claim 1, wherein the preset location is a periphery of the plasma generated within the vacuum chamber.

3. The method of claim 1, wherein the laser beams radiated into the magnetized plasma comprises two laser beams that have a preset or lower level of power and are controlled such that they are directed toward a periphery of the plasma from opposite directions and thus collide with each other.

4. The method of claim 3, wherein, when the laser beams having the preset or lower level of power collide with each other in the magnetized plasma, a critical or higher level of plasma waves are formed, and a current in the plasma waves generates terahertz waves while oscillating at a plasma frequency.

5. The method of claim 4, wherein the terahertz waves are generated through formation of the current, which is stationary and oscillates at the plasma frequency, by the formed plasma, as given by the following equation:

$$\frac{eE_{THz}}{mc\omega} = \frac{\pi}{16}\frac{\omega_c}{\omega_p}\sigma^2 k^2 \alpha_0^4 e^{-0.084\omega_p^2 \tau^2}$$

where $\sigma$ is a length of laser pulses/2, k is a number of laser waves, $\alpha_0$ is a normalized vector potential of the laser beams, $\tau$ is laser beam duration/2, $\omega_p$ is the plasma frequency, $\omega_c$ is eB/m, and $E_{THz}$ is magnitude of the terahertz electric field.

6. The method of claim 4, wherein the magnitude of the electric field inside the plasma is expressed by the following equation:

$$\frac{e\hat{E}(x,t)}{mc\omega_p} \simeq -\frac{\bar{\sigma}_J j_0}{\sqrt{2}}\frac{\bar{t}^{3/2}}{\bar{x}^2}\cos\left(\frac{\bar{x}^2}{2\bar{t}} + \frac{\pi}{4}\right) \quad \begin{array}{l}\bar{\sigma}_J = \omega_p \sigma_J/c \\ j_0 = J_0/en_0 c \\ \bar{t} = \omega_p t\end{array}$$

where $J_0$ is a current density deduced from the following equation:

$$\frac{eE_{THz}}{mc\omega} = \frac{\pi}{16}\frac{\omega_c}{\omega_p}\sigma^2 k^2 \alpha_0^4 e^{-0.084\omega_p^2 \tau^2}$$

where $\sigma$ is a length of laser pulses/2, k is a number of laser waves, $\alpha_0$ is a normalized vector potential of the laser beams, $\tau$ is laser beam duration/2, $\omega_p$ is the plasma frequency, $\omega_c$ is eB/m, and $E_{THz}$ is magnitude of the terahertz electric field.

7. An apparatus for generating high-power terahertz waves, comprising:
   a vacuum chamber;
   a gas regulator configured to supply a gas to the vacuum chamber;
   a laser generator configured to generate laser beams having a preset level of energy and a preset or lower level of power, and to radiate two laser beams toward a periphery of plasma within the vacuum chamber from opposite directions so that the two laser beams collide with each other;
   a plasma generator configured to generate plasma in response to a laser beam radiated into the vacuum chamber and focused on the gas; and
   a magnetic field generator configured to magnetize the plasma generated by the plasma generator, and to generate terahertz waves of a predetermined frequency using oscillation of the plasma generated through the collision of the opposite laser beams by the laser generator.

* * * * *